(12) United States Patent
Vespasien

(10) Patent No.: US 8,725,334 B2
(45) Date of Patent: May 13, 2014

(54) SYSTEM FOR CONTROLLING THE TORQUE APPLIED TO THE WHEELS OF A VEHICLE PROVIDED WITH AT LEAST ONE ELECTRIC MOTOR

(75) Inventor: Jean-Marie Vespasien, Cholsy-le-Roi (FR)

(73) Assignee: Renault S.A.S., Boulogne-Billancourt (FR)

( * ) Notice: Subject to any disclaimer, the term of this patent is extended or adjusted under 35 U.S.C. 154(b) by 177 days.

(21) Appl. No.: 13/319,823

(22) PCT Filed: Apr. 21, 2010

(86) PCT No.: PCT/FR2010/050768
§ 371 (c)(1),
(2), (4) Date: Dec. 22, 2011

(87) PCT Pub. No.: WO2010/130908
PCT Pub. Date: Nov. 18, 2010

(65) Prior Publication Data
US 2012/0109441 A1 May 3, 2012

(30) Foreign Application Priority Data
May 11, 2009 (FR) .................................... 09 53084

(51) Int. Cl.
*B60L 7/18* (2006.01)
(52) U.S. Cl.
USPC .............................................. 701/22; 701/70

(58) Field of Classification Search
None
See application file for complete search history.

(56) References Cited

U.S. PATENT DOCUMENTS

| | | | | |
|---|---|---|---|---|
| 5,581,465 | A * | 12/1996 | Adler et al. | 701/110 |
| 6,324,449 | B2 * | 11/2001 | Albert et al. | 701/22 |
| 2003/0132044 | A1 | 7/2003 | Kitano et al. | |
| 2005/0189894 | A1 | 9/2005 | Komiyama et al. | |
| 2006/0022519 | A1 | 2/2006 | Ji et al. | |
| 2010/0087975 | A1 * | 4/2010 | Dower | 701/22 |

FOREIGN PATENT DOCUMENTS

| | | |
|---|---|---|
| FR | 2 749 229 | 12/1997 |
| JP | 11 215610 | 8/1999 |

OTHER PUBLICATIONS

International Search Report Issued Oct. 5, 2010 in PCT/FR10/050768 Filed Apr. 21, 2010.

* cited by examiner

*Primary Examiner* — Michael J Zanelli
(74) *Attorney, Agent, or Firm* — Oblon, Spivak, McClelland, Maier & Neustadt, L.L.P.

(57) ABSTRACT

A method for controlling torque applied to wheels of a vehicle including at least one electric motor connected to a battery and connected to at least one driving wheel. The motor is capable of operating as a generator for recharging the battery when the vehicle slows down. A first braking adjustment travel and a second acceleration adjustment travel are applied to the movement of the acceleration pedal of the vehicle, the braking adjustment travel being a continuously decreasing function relative to the charge of the battery.

12 Claims, 5 Drawing Sheets

SYSTEM FOR CONTROLLING THE TORQUE APPLIED TO THE WHEELS OF A VEHICLE PROVIDED WITH AT LEAST ONE ELECTRIC MOTOR

BACKGROUND

The present invention relates to a method for controlling the regenerative braking of an electrically powered vehicle or a vehicle with hybrid combustion engine/electric power. In the case of hybrid vehicles for example, it known practice to apply the motive or driving force of the combustion engine to a first axle system and to apply the motive force of an electric motor to a second axle system of the vehicle. In the case of an all-electric vehicle, the vehicle can be set in motion by a single motor connected, for example, to one axle system of the vehicle or by several motors, for example one motor per axle system of the vehicle, or a motor associated with each wheel. All of the engines and/or motors devoted to propulsion (on the front axle system and on the rear axle system) of the vehicle together with all the associated transmission components (clutches, gearboxes) will be termed PT (for Power Train). In the prior art, it is also known practice, when there is an electric machine acting as a motor to drive the vehicle, for this motor to be operated in a regenerative braking mode, that is to say that, from an electrical standpoint, this machine, which then works like a generator, converts the mechanical energy applied to its rotor into an electric current that can then be regulated in an electric machine controller as a current used to charge an electric battery. In this mode of operation, the consumption of mechanical energy produced by the electrical conversion applies a braking torque to the wheels of the vehicle. This means firstly that the vehicle can be at least partially braked using the electric drive machine operating as a generator, and secondly that the kinetic energy recovered by the braking action can be stored in electrical form in a bank of accumulator cells or battery, this energy being reusable subsequently to propel the vehicle or for ancillary functions. Regenerative braking can be used during actual braking phases, that is to say when the driver presses the brake pedal. This regenerative braking has been developed to work for preference during braking-free deceleration phases, namely when the driver "lifts his foot off" the throttle pedal, without operating the brake pedal. A "neutral point" can thus be defined in the travel of the throttle pedal, as being the point at which the torque transmitted to the wheels by the PT is zero. Beyond the neutral point, the PT supplies the driven wheels with a motive torque. Short of the neutral point, the PT applies a resistive torque to the driven wheels. This resistive torque may be entirely (give or take efficiency losses) converted into electrical energy in the case of an all-electric vehicle. In the case of a hybrid vehicle, this resistive torque can be split into torque generated by the engine braking (due to friction of the mechanical parts, notably of the pistons in the cylinders of the combustion engine) and into a regenerative braking toque which is converted into electricity by the electric motor.

The amount of regenerative braking to be used depends on the kinetic energy available, and therefore on the speed of the vehicle, on the converted electrical energy that the vehicle can absorb by direct consumption or by storage in a battery. In order to take these variations into consideration, patent application US 2006/137925 proposes using a computer to modify the motive or resistive torque values associated with the various positions of the throttle pedal (which will in the remainder of the text be simply termed the "pedal"), the modification being made as a function of the mode of operation of an electric or hydraulic regenerative device. The solution proposed is expensive to implement because it assumes the installation of a special-purpose computer inserted between the pedal and the PT, and wiring from the computer to the pedal, the regenerative system and the PT. The document does not specify how drivability is taken into consideration in the modifications to the way in which the pedal behaves.

Further, the batteries of a vehicle cannot be recharged beyond their maximum charge level. The level of regenerative braking has therefore to be limited as the battery gradually approaches its fully charged level, and this regenerative braking has to be increased again when the battery charge decreases. The document does not propose how to manage these variations as a function of battery charge level either.

BRIEF SUMMARY

One object of the invention is a system for controlling the torque at the wheels using a throttle pedal (or other equivalent device for transmitting a graduated setpoint), that allows the driver to meter the level of resistive or motive torque applied to the wheels of the vehicle while at the same time, as a function of vehicle battery charge, varying the resistive deceleration torque available. The system needs to maintain drivability, notably by intuitive use of the pedal, and by ensuring that the vehicle continuously behaves in a consistent manner.

One subject of the invention is a method for controlling the torque at the wheels of a vehicle equipped with at least one electric motor connected to a battery and connected to at least one driven wheel, the motor being able to operate as a generator to recharge the battery while decelerating the vehicle. A first braking-regulating travel and a second acceleration-regulating travel are imposed on the movement of the vehicle throttle pedal, the braking-regulating travel being a continuous decreasing function of the battery charge. The braking-regulating travel can thus change as a function of battery charge between a maximum value, for example between one 0.2 and 0.4 times the total pedal travel, and a minimum value which may for example be a zero travel.

When there is no action on the pedal, a torque may be applied at the wheels which is a minimum torque function that is a continuous function of vehicle speed and of battery charge. This function is indicative of a motive torque or of a torque that is zero over a range of speeds lower than a limit speed, and this function is indicative of a resistive torque that is non-zero at least at one point, of an absolute value that decreases with respect to battery charge, over a range of speeds higher than the limit speed.

Advantageously, when the pedal is in its maximum-travel position, the torque imposed at the wheels is a maximum torque function indicative of a motive torque that varies continuously as a function of vehicle speed alone.

For preference, the maximum torque function is a function the absolute value of which decreases with respect to vehicle speed.

Over a range of speeds higher than the limit speed, the neutral point of the pedal, which means to say the movement of the pedal for which neither a motive torque nor a resistive torque is applied to the wheel, may be the product of a first continuous non-saturation function that decreases with battery charge and of a second continuous function that increases with speed.

In one preferred embodiment, the minimum torque function is obtained from a reference function, that is mapped as a function of vehicle speed, by imposing on this function a threshold of resistive or zero torque equal to a threshold recharge torque the absolute value of which is a decreasing continuous function of battery charge.

The non-saturation function may be chosen to be equal to the quotient of the threshold recharge torque divided by the highest resistive torque value of the reference function.

Advantageously, for a given vehicle speed belonging to a range of speeds higher than the limit speed, the value of the torque imposed on the wheel varies as a linear function of the distance of the pedal away from its neutral point, in each of the two ranges of movement of the pedal on each side of the neutral point.

Advantageously, for a given vehicle speed lower than the limit speed, the value of the torque imposed on the wheel varies linearly over the entire travel of the pedal.

In another aspect, a subject of the invention is a system for controlling the torque at the wheels of a vehicle equipped with at least one electric motor connected to a battery and connected to at least one driven wheel. The motor is able to operate as a generator in order to recharge the battery while decelerating the vehicle. The system comprises a throttle pedal connected to an electronic control unit. The electronic control unit is configured to impose, according to the position of the pedal, a motive torque or a resistive torque on the driven wheel via a power train that includes the electric motor. The electronic control unit imposes, on the movement of the throttle pedal, a first braking-regulating travel and imposes, on the movement of the throttle pedal, a second acceleration-regulating travel the amplitude of which is a continuous increasing function of battery charge.

According to an alternative form of embodiment, the power train comprises only electric motors.

According to another alternative form of embodiment, the power train comprises at least one combustion engine and at least one electric motor.

BRIEF DESCRIPTION OF THE DRAWINGS

The present invention will be better understood from reading the detailed description of one embodiment taken by way of entirely nonlimiting example and illustrated by the attached drawings, in which.

DETAILED DESCRIPTION

Figure 1:
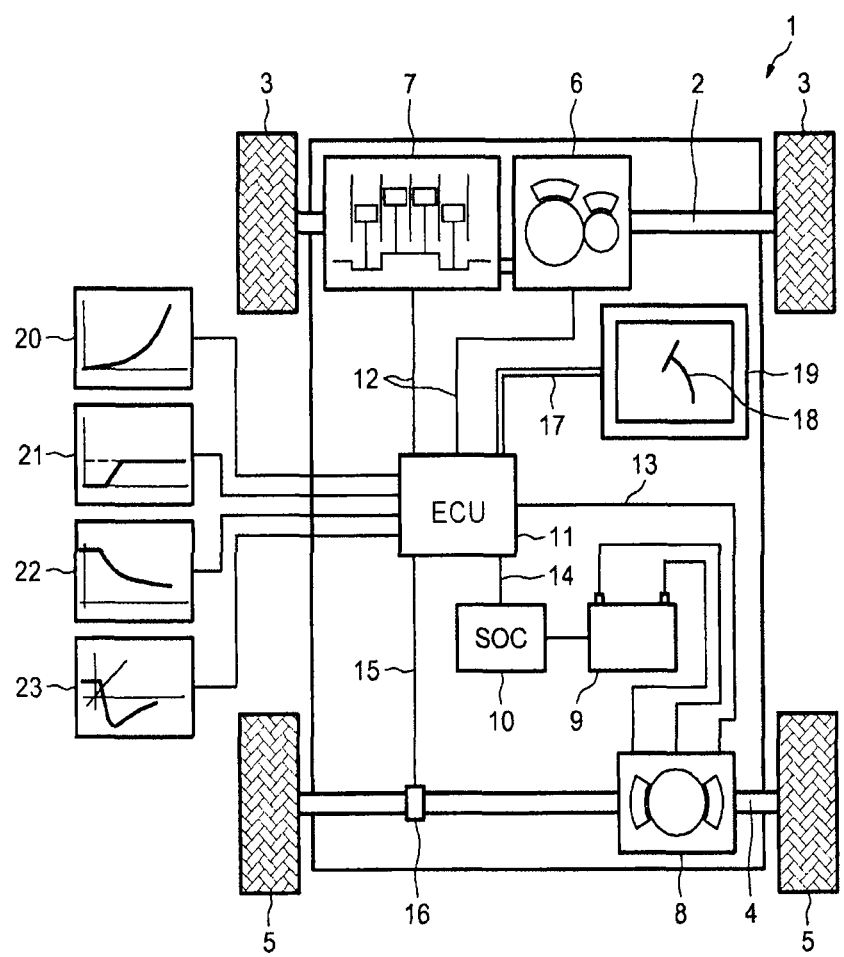
FIG. 1 is a schematic depiction of a hybrid vehicle equipped with a control system according to the invention.

As illustrated in FIG. 1, a hybrid vehicle 1 is equipped with a front axle 2 bearing two driven wheels 3 and is equipped with a rear axle 4 bearing two driven wheels 5. The rotation of front wheels 3 can be driven by a combustion engine 7, via a transmission system 6 notably comprising a clutch and a gearbox.

An electric motor 8 is positioned in such a way that it can be made to rotate as one with the rear wheels 5, via a reduction gearbox (not depicted). The electric motor 8 is connected to a battery 9 from which it can draw electrical energy to apply a motive torque to the wheels 5, or to which it can send electrical current produced when the motor is applying a resistive torque to the wheels 5, also known as a "regenerative braking toque". The battery 9 is connected to a local computer 10 capable of calculating a value SOC (state of charge) indicative of the level of charge in the battery 9.

An electronic control unit 11 via connections 12 and 13 respectively controls the torques applied by the combustion engine 7 and by the electric motor 8 to the front wheel axle system and to the rear wheel axle system of the vehicle. The electronic control unit in the conventional way comprises a microprocessor or central processing unit, random access memories, read-only memories, analog-digital converters and various input and output interfaces.

The electronic control unit 11 is also connected via a connection 14 to the state of charge computer 10 and by a connection 15 to a rev-counter 16 located at one of the vehicle wheel axle systems and allowing it to evaluate a speed of travel V of the vehicle. The electronic control unit 11 is also connected by a group of connections 17 to a man-machine interface 19 notably comprising a throttle pedal 18. The electronic control unit 11 contains, in internal or external memories, maps 20, 21, 22 and 23 in which functions of the vehicle speed V and of the charge or SOC of the battery are mapped. The electronic control unit 11 via the connections 17 receives a value $\alpha$ indicative of the position of the throttle pedal 18. The value $\alpha$ may, for example, be a relative angular position of the pedal, taking as the position of the origin "0" the position in which the pedal is free, that is to say the position in which the driver does not have his foot on the pedal, and assigning the value "1" to the position in which the pedal is fully depressed.

The electronic control unit via the connections 14 receives an SOC value indicative of the state of charge of the battery 9. Using the value of the state of charge SOC of the battery, of the angular position a of the pedal 18 and of the vehicle speed V measured using the rev-counter 16, and using the maps 20, 21, 22 and 23, the electronic control unit 11 determines, using the method that we shall describe later on, a setpoint C for torque at the wheels that is to be applied to the wheels by the engine 7 and motor 8. If the torque setpoint C is a positive value, which means to say that the driver is requesting motive torque at the wheels, the ECU actuates either the electric motor or the combustion engine or both simultaneously in order to obtain the desired torque.

The distribution of propulsion torque C between the engine(s) and motor(s) may for example depend on the electric energy and fuel reserves available (for example, the motor 8 acting as a current generator by taking energy from the torque delivered by the combustion engine 7), or on a specific instruction from the driver using the man-machine interface 19 (for example driving in exclusively electric mode in town). When the setpoint torque C is negative, which means to say that the driver of the vehicle is requiring braking torque or deceleration of the vehicle, the resistive torque will be the sum of an engine braking torque developed by the combustion engine 7, notably corresponding to the friction of the pistons in the cylinders of the engine 7, and of a regenerative braking torque developed by the electric motor 8, allowing electrical current to be produced and sent to the battery 9.

The electronic control unit 11 then controls the combustion engine 7 to adapt the engine braking to suit the vehicle speed, and controls the combustion motor 8 to make it develop a complementary resistive torque making it possible to obtain the total setpoint resistive torque C.

Figure 2:
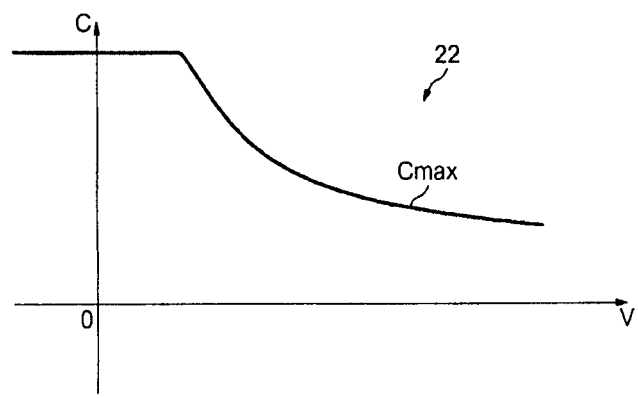
FIG. 2 is an example of a mapped curve used by the control system of FIG. 1.

FIG. 2 depicts one of the operating curves of the system of FIG. 1, which may for example correspond to the map 22 of FIG. 1. This FIG. 2 depicts a curve Cmax representing an engine torque setpoint C (a positive torque using the chosen sign convention) delivered by the ECU when the throttle pedal is in its position of maximum movement, that is to say when α=1. This engine torque setpoint is a function of vehicle speed V alone. It is strictly positive and a decreasing function of speed V. The range covered by this curve comprises positive vehicle speed and extends also as far as negative speeds of the order of a few kilometers/hour. These slightly negative speeds correspond to cases in which the vehicle is rolling back even though a positive motive torque is being applied to the wheels, for example when the vehicle is attempting to move forward up a slope. This maximum torque function Cmax is particularly well suited to the case of exclusively electrically powered vehicles. In the case of hybrid vehicles it is possible to conceive of maximum torque functions that are not decreasing functions over the entire vehicle speed range.

Figure 3:
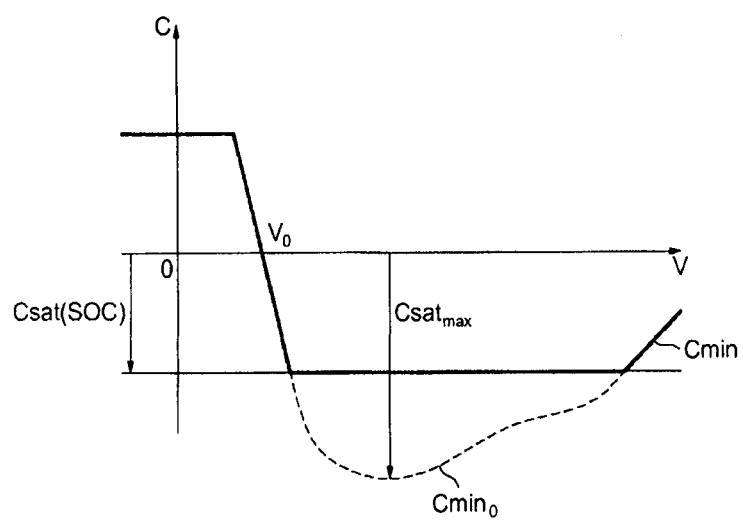
FIG. 3 is an example of a curve deduced from a map used by the control system of FIG. 1.

FIG. 3 illustrates curves of the operation of the system of FIG. 1, which may for example be constructed from the maps 20 and 23 of FIG. 1. This FIG. 3 shows a curve in solid line representing a setpoint torque Cmin delivered by the electronic control unit when the pedal 18 is in the fully up position, that is to say when α=0. This torque setpoint Cmin is depicted here for a given state of charge SOC of the battery. For each state of charge SOC value, the setpoint torque Cmin is a function of vehicle speed V. For small or slightly negative vehicle speed values, the torque setpoint Cmin is positive which means to say that a motive torque is applied to the wheels. The torque setpoint Cmin then decreases as a function of vehicle speed, becomes zero for a speed $V_0$ and remains negative (resistive torque) for values higher than $V_0$. In the range of speeds higher than $V_0$, the torque Cmin first of all decreases with speed, then passes through a minimum before increasing again, which means to say that in terms of absolute value it decreases for high vehicle speeds. The behavior curve thus defined yields a vehicle behavior as a function of vehicle speed which is similar to the usual way in which a vehicle fitted with a combustion engine and sequential gearbox behaves.

Each curve of foot-off setpoint torque Cmin corresponding to a state of charge SOC of the battery can be deduced from a directrix curve $Cmin_0$ depicted in dotted line and which is stored in the map 23 of FIG. 1. Each curve of minimum torque Cmin corresponding to a given state of charge SOC of the battery is obtained by reducing, in absolute value, the curve $Cmin_0$ by a resistive torque value Csat which is also a function of the state of charge of the battery. The resistive torque with the highest value in absolute terms that can be read off the directrix curve $Cmin_0$ is denoted by the value $Csat_{max}$. For low battery charge values, the value Csat is equal to the minimum $Csat_{max}$ of the curve $Cmin_0$. The curve of setpoint torque Cmin corresponding to the current level of charge of the battery then coincides with the directrix curve $Cmin_0$. As the battery charge gradually increases, the value Csat, which represents the maximum resistive torque that the power train consisting of the electric motor 8 and combustion engine 7 can develop in opposition to the movement of the vehicle 1 decreases in terms of absolute value. When the battery can be charged no further, it reaches a resistive torque value that corresponds to engine braking torque from the engine 7 alone.

The reducing value Csat can be mapped as a function of the value SOC of battery charge. This reducing value Csat can also be mapped indirectly, for example in a map 20 of FIG. 1, via a saturation function τ which is a continuous increasing function of the state of charge SOC. This function τ is, for example, chosen to be the 1's complement of the ratio between the reducing torque Csat corresponding to the current battery charge and the highest resistive torque available $Csat_{max}$ when the battery is at its minimum charge level, namely:

$$\tau(SOC) = 1 - \frac{Csat(SOC)}{Csat_{max}}.$$

The ECU 11 can thus deduce the reducing torque Csat using the map 20 and the relationship:

$$Csat(SOC) = Csat(\tau) = (1-\tau)Csat_{max}.$$

The function τ is a continuous function increasing between zero (for a battery at its minimum charge level) and a maximum value $\tau_{max}$ less than or equal to 1. The value $\tau_{max}$ is equal to 1 in the case of an exclusively electrically powered vehicle, because such a vehicle does not have any braking torque from a combustion engine. The saturation function τ can be used instead of the SOC value as a value indicative of the level of battery charge. It is possible to conceive alternative forms of the invention in which the computer 10 delivers the value τ directly to quantify the state of charge of the battery.

Figure 4:
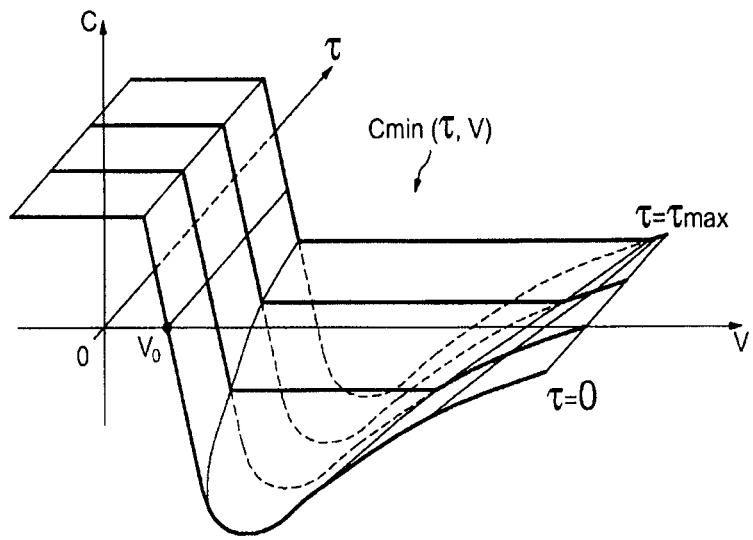
FIG. 4 is a three-dimensional depiction of a minimum torque setpoint function used by the control system of FIG. 1.

By electing to vary the reducing value Csat as a continuous function of battery charge, with an absolute value that decreases as the battery charge increases, an area of value Cmin is obtained that represents the setpoint torque delivered by the ECU when the pedal 18 is up. The function Cmin thus defined, depicted in FIG. 4, is a continuous function of vehicle speed V and of battery charge, it being possible for this battery charge to be represented either in terms of the initial variable SOC or in terms of the saturation function τ.

Figure 5:
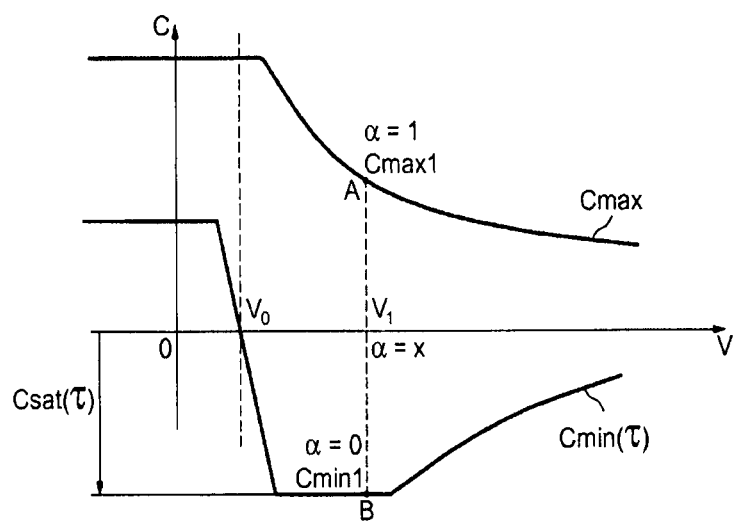
FIG. 5 illustrates one way of interpreting FIGS. 2 and 3.

FIG. 5 is a graphical illustration of the range of variation of the setpoint torque imposed on the wheels by the electronic control unit 11 of FIG. 1 as a function of vehicle speed V and for a given SOC of the battery, characterized by a value τ of the saturation function. For a vehicle speed V1 higher than the limit speed $V_0$, the range of setpoint torques at the pedal is delimited by the straight line segment AB. Point A corresponds to the completely depressed position of the pedal, that is to say to a value α=1. For α=1, the torque applied to the wheels is a motive torque of value $Cmax_1$ which can be read as a function of speed V off the curve Cmax of FIG. 2. Point B corresponds to the completely released position of the pedal, that is to say α=0. The setpoint torque imposed on the wheels is then a resistive torque of value $Cmin_1$, that can be deduced from the construction of FIG. 3 from a directrix curve $Cmin_0$ as a function of V, reduced by a threshold torque value Csat(τ) which is a function of the level of battery charge. Between the two extreme angular positions α=0 and α=1, the setpoint torque is cancelled out for an angular position denoted by the letter X.

For speed values lower that $V_0$, the setpoint torque varies between a strictly positive torque value Cmax and a positive or zero torque value Cmin. The value at the neutral point X is then by convention considered to be equal to zero.

For speeds higher than $V_0$, the maximum resistive torque Csat(τ) that the driver can obtain by releasing the throttle pedal decreases with battery charge. The invention also proposes, when the battery charge increases, for the pedal travel allocated to resistive torques to be reduced.

Figure 6:
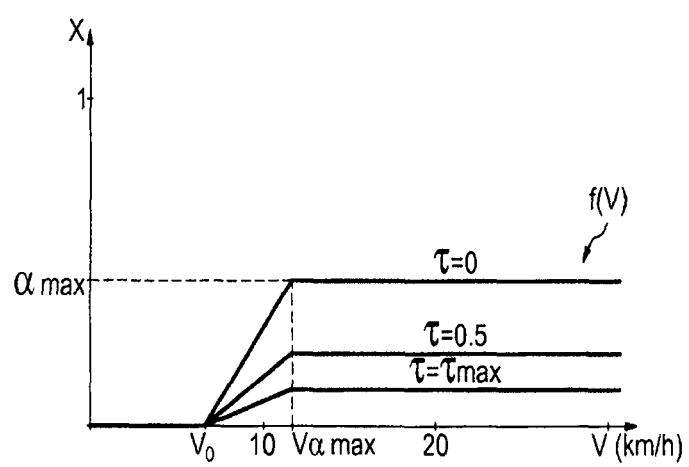
FIG. 6 is an example of mapped curves used by the control system of FIG. 1.

FIG. 6 illustrates one possible way of varying the neutral point function X defined in FIG. 5. The function X(τ, V) depicted in FIG. 5 is the product of a continuous function f(V) and of a function g which is a continuous function of battery charge SOC and decreases with respect to this charge. It is therefore possible, in the same way, to state that it is a continuous and decreasing function of the saturation function τ.

For example, the function g can be chosen to be equal to the 1's complement of the saturation function τ, that is to say that g=1−τ.

In the example illustrated in FIG. 6, the function f is the zero function for speeds lower than the limit speed $V_0$. The function f is equal to a limit position $\alpha_{max}$ for speeds higher than a speed $V\alpha_{max}$. The function f increases for example linearly between $V_0$ and $V\alpha_{max}$. The value $\alpha_{max}$ is the maximum pedal travel that it is desired be allocated to regulating a braking torque. It may, for example, represent approximately one third of the total pedal travel, and for example be between 0.2 and 0.4. The function X, which is defined as the product of the function f that is a continuous function of vehicle speed and the function g which is a continuous function of battery charge, is therefore a continuous function of speed and charge.

The speed $V\alpha_{max}$ is a few km/h higher than the limit speed $V_0$. These two speeds may typically lie between 5 and 15 km/h, for example $V_0$ may lie at around 7 to 8 km/h and $V\alpha_{max}$ may lie at around 9 to 11 km/h. Speeds lower than $V_0$ correspond to speeds at which the vehicle is crawling, that is to say speeds at which the vehicle has a tendency to creep forward even if the driver completely lifts his foot off the throttle pedal. The speed $V\alpha_{max}$ is a transition speed beyond which the neutral point no longer varies as a function of speed, in order to make use of the pedal more intuitive for the driver.

The linear variation between the speeds $V_0$ and $V\alpha_{max}$ ensures continuity in the way in which the pedal behaves between the vehicle pulling away and the moment at which the vehicle reaches a cruising speed. For a saturation level τ=0, that is to say for a battery containing little or no charge, the neutral point varies as the function f(V). As the battery gradually becomes charged and the saturation level τ increases, the function X=f(V)*g(τ) decreases. When the battery is fully charged, the saturation level τ reaches a value $\tau_{max}$ which is dependent on the engine braking torque available in the vehicle. If the engine braking is low, $\tau_{max}$ will be close to the value 1 and the function X(τ, V) will be close to the zero function.

Once the position of the neutral point X has been defined for the current speed of the vehicle and the current state of charge of the battery, a setpoint C for the torque at the wheels is associated with each position α of the pedal. This is done in such a way that, between the neutral point position α=X and the position α=1 at which the pedal is fully depressed, the variation in torque at the wheels is a continuous and strictly increasing function. This is also done in such a way that between the position α=0 of minimum depression of the pedal and the position of the neutral point α=X, the variation in torque at the wheels is continuous and strictly increasing, that is to say decreasing in terms of absolute value (because the torque is a resistive torque which with the chosen sign convention is negative).

For example, the torque at the wheels can be made to vary in proportion with the distance to the netural point (α−X) for speed values V higher than $V_0$ and for α between X and 1, using the following refined function $$C(\alpha) = \frac{\alpha - X(\tau, V)}{1 - X(\tau, V)} * C\max(V)$$

For speed values V higher than $V_0$ and for α between 0 and X, the torque C can also be made to vary linearly with respect to the distance to the neutral point X−α, using the following refined function $$C(\alpha): C(\alpha) = \frac{X(\tau, V) - \alpha}{X(\tau, V)} * C\min(\tau, V).$$

For speeds lower than the limit speed $V_0$, the neutral point X is taken by convention to be equal to zero, and there is no change in sign of the setpoint torque between the two extreme pedal positions. The setpoint torque can then be varied using the following refined function C(α):

$$C(\alpha)=C\min(\tau, V)+\alpha(C\max(V)-C\min(\tau, V))$$

The three refined functions defined for the three ranges above can be summarized into a piecewise refined continuous function expressed as follows:

$$C(\alpha) = \max\left[1 - \frac{\alpha}{X(\tau, V)}; 0\right] * \min[0; C\min(\tau, V)] + \qquad \text{(Equation 1)}$$
$$\max\left[\frac{\alpha - X(\tau, V)}{1 - X(\tau, V)}; 0\right] * C\max(V) +$$
$$(1 - \alpha) * \max[C\min(\tau, V); 0]$$

This then yields a continuous variation in setpoint torque C with respect to the positions α of the pedal, which respects the maximum torque setpoint Cmax and minimum torque setpoint Cmin values and the position of the neutral point X.

Figure 7:
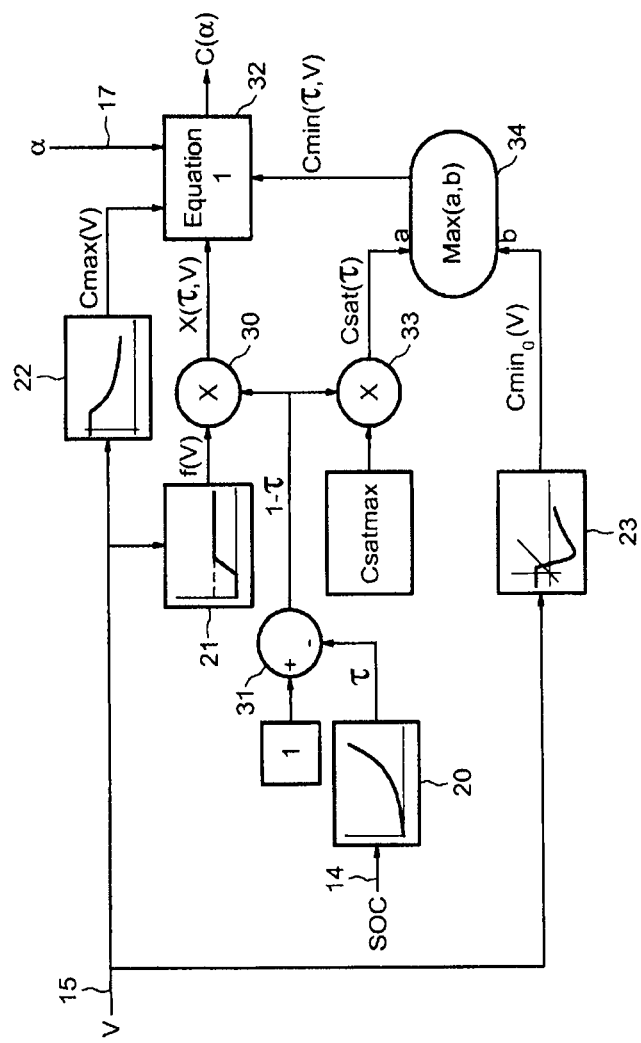
FIG. 7 is a diagram summarizing a control method according to the invention.

FIG. 7 is a diagram summarizing a method of evaluating the setpoint C(α) for torque at the wheels, by the electronic control unit 11 of FIG. 1. FIG. 7 contains elements that are in common with FIG. 1, the same elements then bearing the same references. Via the connection 15 the electronic control unit 11 receives a value V corresponding to the vehicle speed. It uses this value V to look up, in the map 22, a maximum torque value Cmax(V) corresponding to the torque at the wheels that would be assigned to this vehicle speed if the acceleration pedal were in its fully depressed position. It forwards this value Cmax(V) to one input of an evaluator 32.

The electronic control unit 11 also uses the value V to look up, in the map 21, a value f(V) corresponding to the position of the neutral point that the pedal would have for this same speed V if the battery were at its minimum charge level. The electronic control unit 11 forwards this value f(V) to a first input of a multiplier 30.

The electronic control unit 11 finally uses the vehicle speed value V to look up, in a map 23, a value $C\min_0(V)$ that would be the value of the torque imposed at the wheels for this same speed V if the throttle pedal were fully released and if the battery were at its minimum level of charge. It forwards this value to an input of a comparator 34.

Via a connection 14 the electronic control unit 11 also receives an SOC value indicative of the state of charge of the battery. It uses this SOC value to look up, in the map 20, a value τ indicative of a level of saturation of the resistive torque available. This value τ is forwarded to the negative input of a subtractor 31 which on its positive input receives the value 1. The output from the subtractor 31, which delivers a value (1−τ), is connected to one input of the multiplier 30. The output from the multiplier 30 delivers a neutral point value X(τ, V) which is forwarded to one input of the evaluator 32.

The output from the subtractor 31 is also connected to one input of a multiplier 33 which on a second of its inputs receives a constant value $Csat_{max}$ which is the value corresponding to the highest resistive torque that can be read off the curve of the map 23.

The output from the multiplier 33 delivers a value Csat(τ) which is forwarded to one input of the comparator 34.

The comparator 34 compares the two resistive torques Csat(τ) and Cmin₀(V), assigns a value Cmin(τ, V) to that one of the two torques which in terms of absolute value is the smallest and forwards it to one input of the evaluator 32.

The evaluator 32 therefore receives, on three first inputs, a maximum torque value Cmax(V), a minimum torque value Cmin(τ, V), and a neutral point position X(τ, V).

Via the connection 17 the electronic control unit 11 receives a value α representative of the position of the pedal 18. It forwards this value α to a fourth input of the evaluator 32 which, using the values α, Cmax(V), Cmin(τ, V), and X(τ, V), uses equation 1 to calculate the setpoint torque at the wheels C(α).

The invention is not restricted to the embodiments described and can be varied in a number of ways. The throttle pedal may of course be replaced by any other equivalent device for transmitting a graduated setpoint, for example a rotary hand lever, and/or detect linear travel rather than angular travel.

In order further to improve the continuity of behavior of the vehicle, a smoothing of the saturation function τ over time may be performed, in order to avoid the pedal changing its behavior when a heavy consumer of electrical power is switched on.

The functions Cmin and Cmax used in the method can both be variable as a function of battery charge and may possibly be mapped directly as a function of the two variables that are vehicle speed and battery charge, rather than being recalculated from a directrix curve.

The curves of neutral point $X_\tau(V)$ can also be defined as being the product of a function f(V) multiplied by a coefficient g(τ) other than (1−τ). The function g(τ) will then be a continuous decreasing function of τ. In this case, the function g may be covered by a specific map as a function of the state of charge SOC of the battery or as a function of the level of saturation τ of the resistive torque available.

The invention can be applied just as well to a hybrid powered vehicle as it can to an exclusively electrically powered vehicle. In the case of an all-electric vehicle, when the battery is fully charged, there is neither any engine braking nor any regenerative braking available: τ is then assigned the value 1 and the neutral point remains coincident with the foot-off position (X=0) over the entire range of speeds.

It is possible to conceive of a "consistent behavior" variant of the system, in which variant the foot-off torque setpoint always follows the Cmin₀ curve and the driver always obtains the same torque for a given speed and a given throttle pedal position. The system then uses the same Cmin curves as before, to determine the regenerative braking torque to be applied (or, in the case of a hybrid power source, the sum of the regenerative braking torque and of the engine braking torque) and uses the curve Cmin₀ to calculate a complement of hydraulic braking to be added to the regenerative braking when the vehicle battery is full. In this variant, the position of the neutral point is a function of vehicle speed alone.

The vehicle may comprise several electric motors or several combustion engines. The torque imposed by the ECU according to the invention will then be the total torque applied to the wheels. In the case of a hybrid power source, this torque may, in certain configurations, be the sum of a motive torque developed by the combustion engine and of a regenerative braking torque applied simultaneously in order to recharge the battery.

It should also be noted that the above explanations are based on a convention that assigns a positive value to a motive torque and a negative value to a resistive torque. A control system according to the invention could use the opposite sign convention, the directions of variations of the curves needing to be redefined accordingly. Likewise, the opposite convention could be chosen for the vehicle speed sign by choosing speeds in the direction of travel of the vehicle to be negative. The descriptions regarding the directions of variation and signs of the curves would then have to be adapted accordingly.

The invention has been built in the form of calculation units and this can be done using electronic components or computers that are physically independent, or can be done by programming all the logic units and calculation units described in software form. The corresponding program and its subroutines can be embedded in one or more computers which may or may not be incorporated into a central electronic control unit.

The system according to the invention allows the driver intuitively to meter the torque that he needs to apply to the wheels as long as "foot off" braking is available. The way in which the behavior of the vehicle evolves varies progressively as a function of the state of charge of the battery. This then avoids the driver being surprised by sudden variations in torque and allows him to become accustomed to the range of behavior that is current. In its "consistent behavior" variant, the system is transparent to the user. In this variant, the system allows the deceleration force to be distributed between regenerative braking and dissipative hydraulic braking, thereby optimizing the recharging of the battery.

The system makes it possible to optimize the energy account of the vehicle and the battery life, and therefore the overall carbon footprint. It allows intuitive driving of the vehicle, which contributes to drivability and to passenger safety.

The invention claimed is:

1. A method for controlling torque at wheels of a vehicle including at least one electric motor connected to a battery and connected to at least one driven wheel, the motor configured to operate as a generator to recharge the battery while decelerating the vehicle, the method comprising:
    imposing a first braking-regulating travel and a second acceleration-regulating travel on movement of a vehicle throttle pedal, the braking-regulating travel being a continuous decreasing function of the battery charge.

2. The control method as claimed in claim 1, in which, when there is no action on the pedal, a torque is applied at the wheels which is a minimum torque function that is a continuous function of vehicle speed and of battery charge, the function being indicative of a motive torque or of a torque that is zero over a range of speeds lower than a limit speed, and the function being indicative of a resistive torque that is non-zero at least at one point, of an absolute value that decreases with respect to battery charge, over a range of speeds higher than the limit speed.

3. The control method as claimed in claim 2, in which, over a range of speeds higher than the limit speed, a neutral point of the pedal, which is a movement of the pedal for which neither a motive torque nor a resistive torque is applied to the wheel, is the product of a first continuous non-saturation function that decreases with battery charge and of a second continuous function that increases with speed.

4. The control method as claimed in claim 3, in which the minimum torque function is obtained from a reference function, that is mapped as a function of vehicle speed, by imposing on the reference function a threshold of resistive or zero torque equal to a threshold recharge torque, the absolute value of which is a decreasing continuous function of battery charge.

5. The control method as claimed in claim 4, in which the non-saturation function is equal to the quotient of a threshold recharge torque divided by a highest resistive torque value of the reference function.

6. The control method as claimed in claim 2, in which, for a given vehicle speed belonging to a range of speeds higher than the limit speed, the value of the torque imposed on the wheel varies as a linear function of a distance of the pedal away from its neutral point, in each of two ranges of movement of the pedal on each side of the neutral point.

7. The control method as claimed in claim 2, in which, for a given vehicle speed lower than the limit speed, the value of the torque imposed on the wheel varies linearly over an entire travel of the pedal.

8. The control method as claimed in claim 1, in which, when the pedal is in a maximum-travel position, the torque imposed at the wheels is a maximum torque function indicative of a motive torque that varies continuously as a function of vehicle speed alone.

9. The control method as claimed in claim 8, in which the maximum torque function is a function, the absolute value of which decreases with respect to vehicle speed.

10. A system for controlling torque at wheels of a vehicle including at least one electric motor connected to a battery and connected to at least one driven wheel, the motor configured to operate as a generator to recharge the battery while decelerating the vehicle, the system comprising:

a throttle pedal connected to an electronic control unit; and an electronic control unit configured to impose, according to a position of the pedal, a motive torque or a resistive torque on the driven wheel via a power train that includes the electric motor, wherein the electronic control unit imposes, on movement of the throttle pedal, a first braking-regulating travel and imposes, on the movement of the throttle pedal, a second acceleration-regulating travel an amplitude of which is a continuous increasing function of battery charge.

11. The control system as claimed in claim 10, in which the power train comprises only electric motors.

12. The control system as claimed in claim 10, in which the power train comprises at least one combustion engine and at least one electric motor.

* * * * *